July 28, 1942. W. P. DEPPÉ 2,291,534

METHOD OF MAKING REFRACTORIES

Filed Jan. 30, 1941

William P. Deppé INVENTOR.
BY Luis Shumacher
ATTORNEY.

Patented July 28, 1942

2,291,534

UNITED STATES PATENT OFFICE 2,291,534

METHOD OF MAKING REFRACTORIES

William P. Deppé, Brightwaters, N. Y.

Application January 30, 1941, Serial No. 376,661

11 Claims. (Cl. 49—77)

This invention relates to refractories and methods of producing the same.

In industrial operations at temperatures above 3000 degrees F., refractories present a difficult, ever present problem, first, because refractories for such temperatures are costly, and second, because the best refractories today available have a short life when operated at such temperatures. When the refractory "burns out," its heat resistance quality rapidly diminishes, and it becomes exceedingly brittle and cracks so that retention of the high temperature ability and prevention of leakage of melted metals and the exceedingly hot gases is no longer possible. Hence the furnace or other high temperature equipment must be shut down and relined with new refractory, and this results in additional costs and a loss of production.

In operating at temperatures up to 6000 degrees F., or above, the problems mentioned are greatly accentuated in refractories now in commercial use, to such a degree that satisfactory operations at such temperatures are almost impossible.

If the refractories now in commercial use are in contact with melted metals, such as iron, there is a tendency to "slagging" at approximately 2200 degrees F., in silicon carbide for example, and this increases so rapidly with a rise in temperature, that at 3000 degrees F., and higher, the refractory will absorb the iron in a manner similar to a sponge absorbing water, producing what may be called a "slag," and resulting in a final breaking down of the refractory material.

In firing with combustible gas in contact with the refractory, which is the most efficient and most easily controlled fuel in the heat treatment of metal products, a system of firing known as catalytic or surface combustion may be used. This utilizes primarily the radiant heat of a granular refractory mass, with the actual combustion occurring in the spaces or interstices between the refractory particles or bodies. The metals are kept out of contact with the surface combustion bed, but the gases leaving the latter may be freely circulated around the furnace chamber, in which metal objects may be heated above their melting or fusion points. If the granules of the surface combustion bed are properly proportioned to insure complete combustion and without scoring of the refractory walls by excessive velocity of burning gases, and the bed is underfired, temperatures of 3600 to above 4000 degrees F., are available within the bed, with incipient melting which begins and progressively increases even with the best refractories now commercially available. This incipient melting increases resistance to the flow of gases through the surface combustion bed and reduces the so-called catalytic action of surface combustion, since the speed of combustion of the fuel gases is promoted by the hard rough surfaces and points of the refractory pieces or granules. When thus used, the best commercial refractories now in use, even if no "slagging" has occurred, must be replaced frequently after firing if maximum efficiency is desired at these high temperatures which are available with an underfired bed of surface combustion refractories as described herein.

Neither burning solid fuels nor their gases, nor the electric arc, in contact with metals furnish any help to the solution of the problems above mentioned, because they can burn and seriously injure the metal product, and for other reasons that will be apparent to those skilled in the art. To the contrary, the atmosphere of a gas fired furnace, as described, is readily controlled without flames coming in contact with metals, and the desired distribution of the heat can be effected with ease and compactness of furnace construction. Moreover, gas fuel is often low in cost and may be available as a by-product in various industrial operations.

Metallurgists have long sought to obtain the possible advantages in high temperature refractories herein referred to, for use in industrial systems, and experts in refractories have long sought to improve refractories with that end in view, but without success in the higher temperatures arrived at in this new process.

It is therefore one object of the invention to produce an improved refractory which shall have a substantially higher melting or fusion point than any heretofore available, and to produce the same at relatively low cost.

Another object of the invention is the provision of an improved refractory having substantially higher resistance against "slagging" with molten metals and greater resistance to hot gases, than any now known.

Another object of the invention is to furnish an improved surface combustion bed having a substantially longer life and higher temperature range.

Another object of the invention is to provide an improved process for the production of refractories of superior qualities at higher temperatures or capable of altering the molecular combinations in the elements used in making refractories physically or chemically, or both.

Other objects and advantages of the invention will become apparent as the specification proceeds.

With the aforesaid objects in view, the invention consists in the novel combination of producing high temperatures and better refractory products, and arrangements of parts hereinafter described in their preferred embodiments, pointed out in the subjoined claims, and illustrated in the annexed drawing, wherein like parts are designated by the same reference characters throughout the several views.

Figure 1:
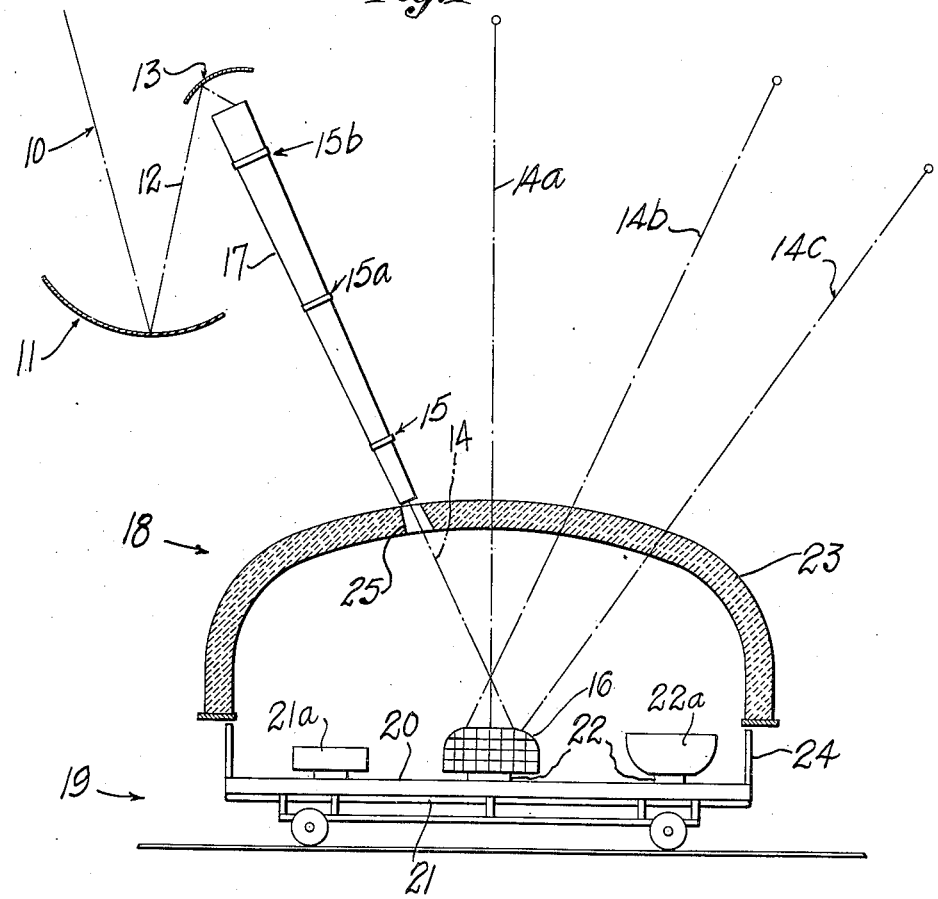
Figure 1 is diagrammatic vertical view, with parts in section and parts in elevation, and certain parts omitted or schematically indicated, showing a device according to the invention.

The description following relates to an illustrative refractory crucible in which metals may be melted and where the metals are out of contact with burning gaseous fuels which are utilized under catalytic or surface combustion conditions.

Generally described, the invention provides a refractory material which is substantially homogeneous, in that the elements thereof are in molecular proximity to each other so as to closely approximate or actually attain a condition like that of a solid or chemical solution. This is in contradistinction to the mere mechanical or haphazard bonding or fusion together of particles of considerable size as in refractories heretofore known, as is further distinguished from refractories which are of porous and varying crystalline structure and which readily "slag" with molten metals. Thus, my improved refractory due to an improved substantially homogeneous molecular solution or mixture, the result of high temperatures and stage heating and intermittent heat application, with repeated heat treatments, has superior resistance and durability and a greatly increased melting point over present-day commercial refractories. Thus a surface combustion bed is also attainable having capabilities for high temperatures beyond anything that could be realized heretofore. The refractory mentioned may consist of a single refractory substance or of a plurality of such substances, and in the latter instance, may include a high temperature refractory in combination with a relatively low temperature refractory. To produce a refractory as above mentioned, it is necessary to utilize a source of heat which is free of violence (as in the case of the electric arc) so as not to disrupt the refractory. A second very important consideration is to provide a method of applying heat in stages and intermittently, such that the refractory shall be self-sustaining in the presence of extremely high temperatures. It will be evident that if the refractory in commercial forms, became completely molten, there would be nothing available to maintain its form so that the process would be inoperative because at least a part of the apparatus involved would be destroyed. Both of the essential requirements above stated are realized by my process, which involves the concentration of solar heat as by reflectors, lenses, or both, and the directing of the concentrated beam of solar light upon successive areas of a refractory mass which has been preformed or arranged in a desired shape or structure and pre-heat treated, as described. A plurality of such heating beams may be used simultaneously and melting or fusion of the refractory is caused to a predetermined degree, but not so rapidly as to produce a fluid or running condition in the whole structure, which would destroy the desired shape or structure. As melting occurs in the element with the lowest fusion point, the melted portion runs into minute interstices in the refractory mass, thereby exposing other portions of refractory to the increasing temperature and which are fused in turn. Thus ultimately different fused masses are relatively homogeneously fused into final mixtures of a required thickness while supported by a refractory mass thereunder which has been heat-treated previously.

The process may be aided by an initial pulverization of the refractory materials to facilitate fusion. The shape or structure desired may be maintained during the process by a suitable supporting structure underneath, or by a refractory used as a binder between the particles of the principal refractories. A refractory of a lower fusing point, as for instance, the refractory binder of cement, or clay, may serve to melt readily to flow and distribute heat during the process to accelerate fusion of the refractories of higher fusion points. The shape or structure may be turned and treated by concentrated solar beams on different sides to thus complete the article.

Referring in detail to the drawing, 10 denotes a beam of radiant energy capable of direct transformation into heat. Such beam may be obtained from light rays of the sun. Various suitable means may be employed for gathering and concentrating the radiant energy. Thus a light gathering reflector 11 for the solar rays 10 reflects a beam 12 onto a reflector 13 which is suitably arranged to cause downward reflection of a beam 14 through various lenses or light concentrating device, such as 15, one or more of which may be employed, of such shape as to obtain the desired concentration upon the work 16 to produce thereon a temperature that is extremely high. The temperature developed may be at least 3000 degrees F., and may be as high as 6000 degrees F., and even higher, if desired.

If desired, the reflectors such as 11 and 13 may constitute concave glass mirrors or burnished metallic members. The lens elements may consist of a high temperature glass, the surface of which need not be so highly accurate as in the case of telescopes. With this invention, a sufficient concentration of light is available with one or more relatively inexpensive crude lenses such as 15, 15a, or 15b. If desired, the lens units may be mounted in a tube or open-latticed structure 17, in any suitable manner that need not be shown herein.

According to one specific arrangement, the light reflectors 11 and 13 may be respectively ten and four feet in diameter, and the lens 15b may be two feet in diameter, while the lens 15 may be one foot in diameter. All the parts may be adjustably spaced and of varying focal length, and arranged to prevent melting of the glass itself.

A plurality of light gathering and concentrating means may be provided like the one above described, but operative at different angles to produce high temperatures at different points or areas of the work 16. This is indicated by the additional light beams along the lines 14a, 14b, and 14c, which are like that at 14.

The light gathering and concentrating devices may be manually or automatically adjustable in any suitable manner and to follow the angle of the beams 10 as the day progresses.

As an illustration, I provide a chamber or furnace 18 which comprises a car 19, the floor 20 of which may consist of refractory materials. The frame of the car may include a cooling system which may include water tubes 21 to prevent overheating of the floor of the car. Resting on the floor of the car is the refractory work 16 to which solar rays are applied and other objects 21a and 22a that are to be heat-treated prior to applying the solar rays. To prevent deterioration of the floor of the car, the work 16 may be placed on small refractory bricks or pedestals 22, which can be broken away if they become fused to the work.

The device 18 may also include a roof or dome 23 which may consist of refractory carried by a suitable frame which may be water-cooled (not shown), so that the same may be lowered over the work and raised to allow the movement of the wagon carrying the refractory floor for removal of the work. The dome 23 may afford a continuous wall around the work, and may extend into engagement or into spaced relation, with a side wall or flange 24 of the car 19, to permit escape of heat in the chamber 18, if desired, to prevent undue heat intensity under the dome roof section. In the roof of the dome 23, there may be provided openings 25 for the concentrated light beams 14, 14a, 14b and 14c, and, if preferred, the tubes such as 17 may be spaced from the dome or water-cooled to avoid overheating of the latter by heat radiation from the refractories being treated.

The apparatus above described may be constructed and designed in detail according to the plant with which it is to be used, and the work which it is to perform, and it may consist of such materials as may be adapted for the accomplishment of its intended purpose. Suitable means, well-known to those skilled in the art (not shown), may be provided to protect it from rain and storm, or excessive cooling.

With the process that may be used with such apparatus, superior refractory materials may be produced for use in the furnaces of locomotives, steamships, power plants, and other industrial equipment; and furnaces, retorts, crucibles, stacks and the like, for the reduction of ores, and for metallurgical and chemical operations such refractories may be utilized for greatly increased life and efficiency at substantially increased temperature ranges.

The process may be used with especial advantage in Florida, Arizona, New Mexico, Hawaii and in all such places where the solar heat is at a maximum for a relatively long period of time, each day, at all seasons.

Among the refractory materials which may be used with my process, I may include diatomic earth, volcanic lava, and other siliceous materials; silicon carbide which melts at 4892 but then decomposes; chromite which melts at 3966; magnesite at 3929; aluminum oxide at about 3800; silicon at 3456; bauxite clay at 3308; zirconium and zirconium oxide which melt at temperatures in excess of 3500, and various clays which melt at temperatures between 2800 and 3000. In certain instances, some metals can be used (in the refractory mixtures) including tungsten whose melting point is said to be above 6000. Carbon, said to sublimate at 6300 approximately, and also graphite, may be utilized as elements in the refractories produced in this process. The above mentioned melting points are all stated in degrees F. These temperatures are merely regarded as approximations, as there are no known methods of accurately measuring high temperatures under the conditions developed in this new process.

One aim and accomplishment of my process may be best understood by considering silicon carbide as now made into refractories. When used as a high temperature refractory, this is in relatively pure form, free of mechanical binders or cements such as are used in producing grinding wheels. This also applies to aluminum oxide. In that highly pure state, both of these refractories are really porous irregular lumps, and the silicon carbide looks like a sponge and is highly crystalline. If iron, for example, which has been heated to its melting point, is in contact with these refractories, it is absorbed thereinto, to produce what may be termed a "slag," and the utility of such refractory for high temperature purposes is soon at an end; the apparatus must be shut down, and the refractory replaced. In silicon carbide or aluminum oxide as now made into crucibles, bricks or other structural elements, the binding element, which necessarily has a lower melting point, diminishes the resistance of the elements to high temperatures in present refractory methods. With my process, as described herein, the aluminum oxide and the silicon carbide, when mixed with other elements, may be fused to provide a refractory of uniform or relatively non-porous texture, or to constitute a microscopically uniform mass, as I have seen evidence to indicate that in such a condition these refractories have a substantially higher resistance to slagging, and further, their incipient melting points are much higher. In the case of silicon carbide, with the temperature and treatment as herein described, it may be such that decomposition becomes at best a reversible reaction which can be controlled, and any resultant carbon or aluminum form substantially homogeneous mixture with the silicon carbide. Thus the refractories, if so desired, may be directly formed into crucibles, bricks and other structural elements without requiring the use of lower melting point cements.

Another highly important phase of my process is in combining a plurality of the refractories in the list hereinbefore given, or refractories of similar characteristics, as distinguished from fusing one refractory element alone. Diatomic earth and volcanic lava are both plentiful and cheap, and the former has the advantages of a very high melting point. The lava is high in silica content, and hence is capable of forming a desirable refractory when used in combination with a high temperature refractory and fused therewith. According to this second phase of my process, I have found that especial advantages result in the fusing together of different refractories, which may thus be combined by chemical or physical action or both, to produce a homogeneous product in the chemical or in the mechanical sense. Such a commercial refractory has a higher melting point, and has a high resistance against slagging and breakdowns by hot gases, and is cheaper than a pure refractory of silicon carbide or aluminum oxide as now produced commercially;

other advantages of production in accordance with my process also result.

According to either phase of the process, the refractory to be treated is first broken up into small pieces or pulverized to a coarse mesh. If different refractories are used, they are then carefully mixed together. One of those refractories may be a clay which has a substantially lower melting point than the others, so that it quickly melts and flows down in and around the interstices in the particles thus transmitting the heat to them, exposing them to receive more of the radiant heat, and holding the particles together by adhesion. Further, the refractory component in this process which has the lower melting point appears to exert a peculiar influence on those components having the higher melting points, and tends to reduce such melting points to accelerate fusion of the latter to produce the relatively homogeneous physical mixture and yet, when this mixture has been produced and has solidified, its melting point has been found to be substantially higher than that which was needed to first produce it.

Hence, in this process, the refractory product may be pre-heat treated two or more times to secure higher fusion points by applying the solar rays to melt the elements to a formless mass. When the desired higher melting points have been produced, the mass may be crushed to any desirable fineness by any suitable mechanical means, then preparing commercial shapes for various purposes and binders used, such as fire clays and cement for final heat treatments.

In effecting the process according to either of the above mentioned phases, the heat may be applied over a period of several hours, or intermittently on several days, with intervals of time during which the new refractory mass becomes stabilized by internal pressure set up in cooling to produce a superior molecular structure. Thus the refractory mass may be permitted to cool during the night at a rate sufficiently slow to avoid cracking thereof. In either event, the temperature applied during successive days or periods may be successively higher; this may be practiced, however, even if there is no time intervals of cooling and heating, so that the efficiency of heat application in stages, is at a maximum, with the temperatures varying according to the refractory components that are to be successively fused; and thus the new refractory mass attains its final condition in a graduated manner, and with an increasing rate of heat absorption. As the process continues, internal pressure due to heat in the refractory mass increases, which promotes the beneficial characteristics sought and aids in producing the fine and even mechanical texture of microscopic character as distinguished from a rough mechanical mixture such as readily observed under the microscope in the case of alloy steels. During the different heat treatments the sun ray reflecting means should be kept clean, and such surfaces dusted and polished.

The process is possible only because solar heat, gathered and concentrated in a suitable manner is controllable and smoothly applied and affords higher temperatures in the work than any heretofore available, except in combustion of explosive materials, or in certain purely laboratory experiments that are too costly and limited in character for commercial use. By way of distinction, the electric arc may be used to produce temperatures of 6000 degrees F., but this is the temperature in the arc itself, and not in the work in which the maximum temperature obviously will be less; moreover, with the arc, the same has the effect of blasting and disrupting the refractory against which it impinges. Nor could an electric current be caused to flow through the mass of the majority of refractories which I employ as they are not good conductors of the electric current. With my process, the application of heat is smooth and non-disruptive and permits smooth gradual heating in the mass of refractory being treated.

Because of the high temperatures used with my process, it is important to provide a means such that the refractory in the final heat treatments of commercial forms, shall not melt down or destroy the support or enclosing table, furnace, crucible or other equipment, because if that occurred, the process would be inoperative. I perceived that a solution for this difficulty is provided by reason of the fact that the speed of penetration of solar heat on noncombustible materials is limited even at high temperatures when applied to refractories, which may be built up in large mass of desired size and form so as to be self-sustaining by frictional or adhesive engagement of the particles with each other according to melting points of different elements used, preliminary to final fusion. Here the nondisruptive quality of the concentrated solar beam is of the essence in the invention.

To facilitate the control of solar ray heat and its application over all of the refractory element being treated, as shown at 16 in Fig. 1 in attached drawing, a portion of the refractory top of movable wagon on which 16 rests, may be constructed so as to revolve either by manual means or by suitable mechanical means, thus applying the solar rays intermittently at any given point. The shifting of the wagon also alters the points in element 16 on which the solar ray heat is applied.

Figure 2:
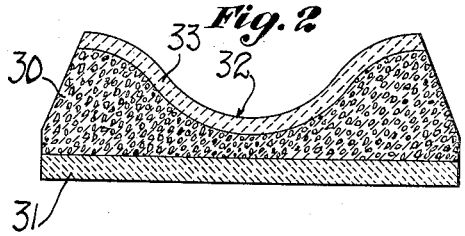
Figs. 2 and 3 are sectional views showing steps in the making of a crucible according to the invention.
Figure 3:
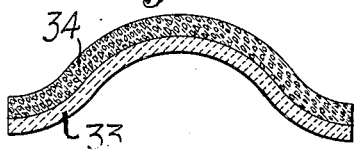

To more clearly explain this feature of the process, reference is had to Figs. 2 and 3, showing the method of making a crucible suitable for being heated by gaseous fuel burning under catalytic or surface combustion conditions in 30 in Fig. 2, according to the invention. In Fig. 2 a mass 30 of finely divided carefully mixed refractory properly heat-treated, has been provided, on a suitably shaped or plane refractory plate 31, the upper part of the mass being shaped concave at 32 to correspond to the inside of the crucible which has previously been heat-treated. The successive applications of heat, as by concentrated solar beams at 14, 14a, 14b and 14c, in Fig. 1, have fused the upper surface portion into a layer 33. This layer 33 may be allowed to cool slowly for a period of time, and again subjected to the process to fuse the mass 34 together and to the layer 33 to form with the latter a substantially homogeneous physical mass forming a crucible of desired thickness and strength. In the same manner, additional layers may be added for further thickness.

Suitable inlets and outlets must be provided in the mass 30 for the combustible gases to be used therein under surface combustion conditions.

With the process indicated in Figs. 2 and 3, it will be seen that the refractory mass actually forms a furnace portion in that it is the primary seat of heat application, and while a portion of the refractory mass is being fused, another portion thereof supports the fused part thus insulating it from the car floor or bottom of the main furnace chamber and rendering the refractory mass in which the fusion occurs self-sustaining.

Figure 4:
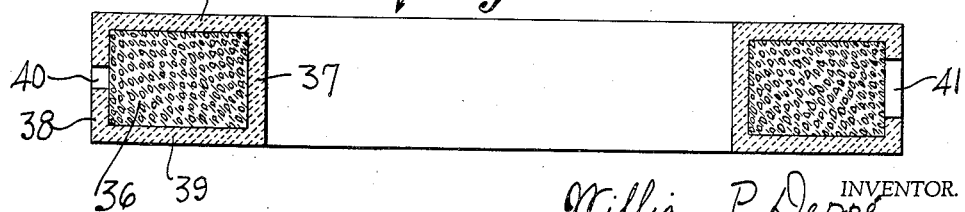
Fig. 4 is a sectional view of a surface combustion heater according to the invention.

In Fig. 4 is shown an arcuate or ring shaped surface combustion block 35 having an internal mass consisting of small lumps or broken pieces of high temperature refractory 36, produced as hereinbefore described. The spaces therebetween provide the irregular passages for the flame according to this catalytic combustion. These spaces must be sufficient to prevent scoring of the refractory by excessive gas velocity. Enclosing the refractory 36 is a shell comprising inner and outer walls 37, 38 and side walls 39. Formed in the wall 38 is an inlet 40 and an outlet 41, the former for the gas-air mixture, the latter for the exhaust gases. The shell 37, 38, 39 may have been formed with a component of cement and clay for easy molding and thoroughly fused according to my process, after being applied around the refractory mass 36 as shown. Thus the walls become fused to some of the outer and innermost lumps 36 to permit the flame travel in immediate proximity to the walls. If desired, the four walls may be separately constructed and fused together without using a binder; and then such walls may be placed around the refractory mass 36 and the walls fused together along the four corners, affording a maximum internal capacity for gaseous flow and an extreme durability in use.

It is obvious that refractory articles such as indicated at 21a and 22a, may be preheated without solar rays being put on same, while the refractory article 16 is being treated by application of the solar ray heat which in turn, heats up the ambient under the roof section.

It is understood that I am not limited to any particular design or proportions of apparatus and elements in products for the purposes cited herein, nor limited to the exact temperatures mentioned herein, in refractories or combinations thereof with other minerals, for the purposes named.

It will be obvious to those skilled in the refractory art, that the illustrative examples described herein, will show how this new process may be applied in the production of higher temperature refractory elements for the purposes outlined on page 3 herein.

I claim:

1. The method of producing high temperature refractory materials including concentrating a beam of radiant energy which is capable of directly generating heat in the surface portion of a refractory mass and causing said heat to melt and fuse the refractory into a mass which is a substantially homogeneous mixture upon solidification.

2. The method of producing high temperature refractory materials, including gathering and concentrating solar energy upon a refractory mass and causing the elements therein to be melted and fused into a uniform mass by the heat generated, impervious to molten metals and hot gases up to 6000 deg. F. and above.

3. The method of producing high temperature refractory materials, including pulverizing and mixing together different high temperature refractory materials, gathering and concentrating solar energy upon the pulverulent mass and causing fusion of at least a surface portion thereof into a body which is microscopically uniform upon solidification.

4. The method of producing high temperature refractory bodies, which includes pulverizing and mixing refractory materials, moulding the same in shape like the form of the body to be produced, gathering and concentrating solar energy upon the surface of the moulded form, and maintaining the latter thus heated until surface portions melt and fuse together into a substantially homogeneously mixed condition while being supported by unmelted refractory underneath, then slowly cooling the body produced.

5. The method of producing high temperature refractory materials, including pulverizing and mixing together different high temperature refractory materials, gathering and concentrating solar energy upon the pulverulent mass and causing fusion thereof into a body, which is substantially microscopically uniform upon solidification, at least one of said refractory materials having a melting point substantially lower than that of the other materials, in order to rapidly melt and flow in and between the pulverulent particles, to rapidly conduct heat to those particles which have not yet softened by reason of higher melting points.

6. The process of increasing the melting breakdown point of a refractory mass, including providing such a refractory mass consisting of refractory substances having different melting points and being in closely intermixed condition, applying concentrated solar heat to said mass in successive stages separated by substantial time intervals at temperatures to permit physical and chemical changes in the elements in the refractory mass, and with said concentration being sufficient to produce increasing high temperatures for the progressive melting and fusing of the refractory substances during the process.

7. The process according to claim 6, wherein said refractory mass is cooled during the said time intervals.

8. The process according to claim 6, wherein the successive stages are performed at successively increasing temperatures.

9. The process according to claim 6, wherein the said mass is heated during said intervals at temperatures substantially lower than the said melting temperatures to bake the mass.

10. The method of producing high temperature refractory materials including concentrating a beam of radiant energy which is capable of directly generating heat in the surface portion of a refractory mass and causing said heat to melt the refractory into a mass which is a substantially homogeneous mixture upon solidification, crushing the mass so produced, mixing together the pulverized mass into commercial forms with binder elements, and again heat-treating the resultant mass in the same manner to assure a mixture which is substantially homogeneous for substantial depth.

11. The method of producing high temperature refractory materials for purposes described, including concentrating a beam of radiant solar energy which is capable of generating heat in the surface portion of a refractory mass and causing said heat to spread in the mass at temperatures capable of causing physical and chemical changes in the refractory elements used, and to melt and fuse the refractory mixture into a mass which is substantially homogeneous upon solidification and capable of resisting slagging by molten metals or breaking down by hot gases.

WILLIAM P. DEPPÉ.